United States Patent Office 2,887,656
Patented May 19, 1959

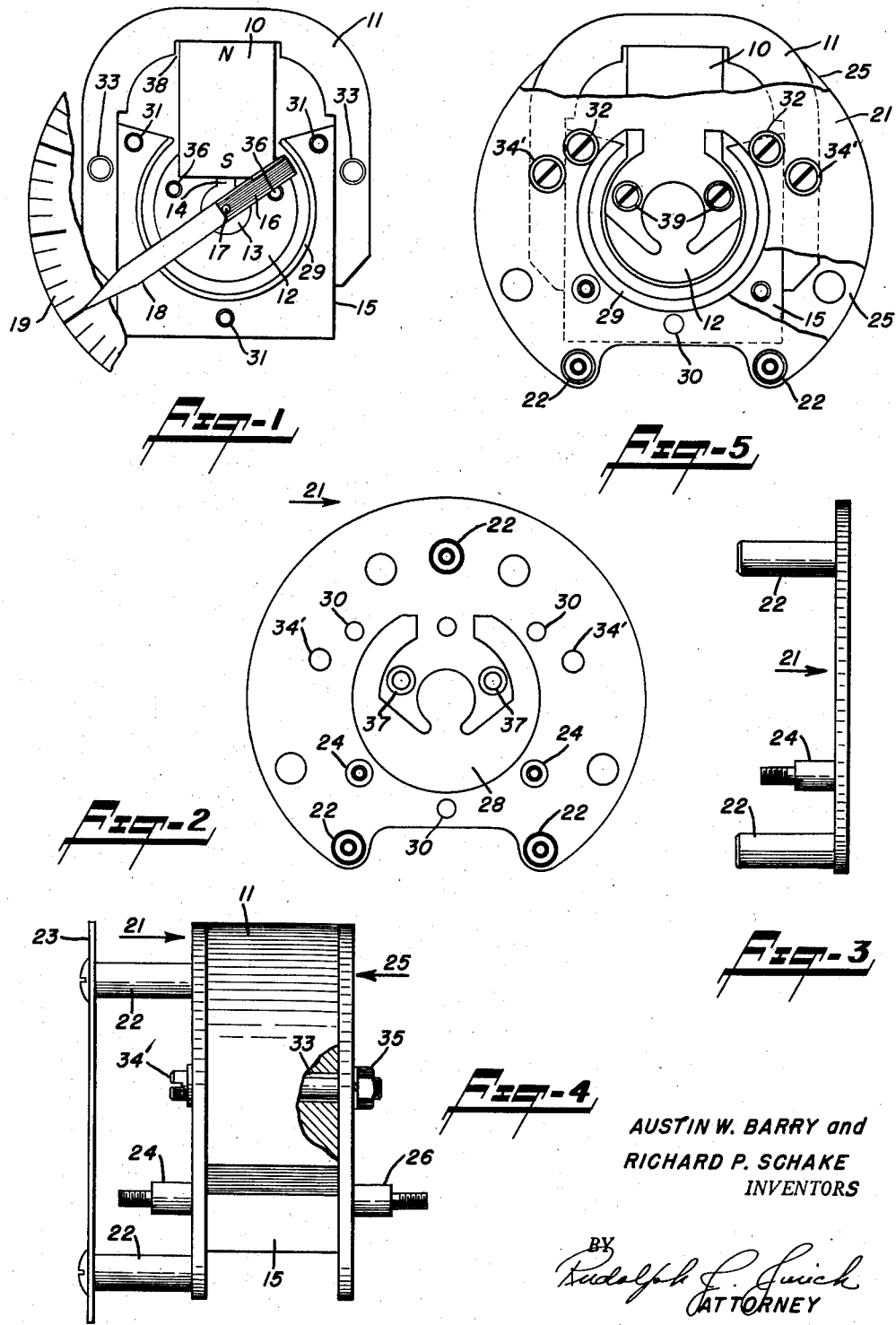

2,887,656
LONG SCALE ELECTRICAL INSTRUMENT

Austin W. Barry, Linden, and Richard P. Schake, East Orange, N.J., assignors, by mesne assignments, to Daystrom, Incorporated, Murray Hill, N.J., a corporation of New Jersey Application July 12, 1956, Serial No. 597,436

6 Claims. (Cl. 324—150)

This invention relates to electrical instruments of the permanent magnet, movable coil class and more particularly to an arrangement for conveniently adjusting the deflection characteristics of long scale instrument mechanisms whereby all mechanisms of a given design may be used with a single, preprinted scale.

In instruments having a long pointer deflection as, for example, 270 angular degrees, the assembled instrument mechanisms will vary in deflection characteristics. Such variations in the mechanisms occur in spite of exceptional care applied to the construction of each part going to make up the mechanism. Of course, if each scale to be used with a given mechanism is hand calibrated, each completed instrument will fall within a desired accuracy of indication, but such hand calibration of each scale is costly and does not lend itself to high quantity production. When preprinted scales are used, the variations in the deflection characteristics, between mechanisms of apparently identical construction, necessitates the preprinting of a plurality of scale groups each group differing slightly in calibration. During the assembly of the instrument a scale of a particular group is matched to a particular mechanism by actual electrical test. In actual practice, it has been necessary to carry twelve different scale groups to maintain a continuous production of long scale instruments of a given model.

It is apparent, therefore, that a considerable saving could be effected by providing an arrangement whereby all scales will be exactly alike and each instrument mechanism could quickly and conveniently be adjusted so that the pointer will track with the scale markings. The present invention is directed to the provision of such arrangement.

An object of this invention is the provision of a long scale, permanent magnet, movable coil instrument including means for adjusting the magnetic circuit whereby the deflection characteristics of the mechanism can be made to conform to a preselected scale.

An object of this invention is the provision of a long scale instrument comprising a permanent magnet, a core spaced from a pole piece to form a magnetic flux gap, a movable coil rotatable in the flux gap, a pointer carried by the movable coil and movable over a precalibrated scale, and means to adjust the magnetic position of the core relative to the pole piece in two directions.

These and other objects and advantages will become apparent from the following description when taken with the accompanying drawings. In the drawings wherein like reference characters denote like parts in the several views:

Figure 1 is a plan view showing the components that make up the mechanism of an instrument made in accordance with this invention, Figure 2 is a plan view of the upper mounting plate, Figure 3 is a side view of the upper mounting plate, Figure 4 is a side view showing the magnetic system secured between the upper and lower mounting plates; and Figure 5 is a plan view of the Figure 4 assembly with the scale plate removed and portions of the upper mounting plate broken away.

Reference is now made to Figure 1 wherein there is shown a generally rectangular bar magnet 10 one polar end of which abuts against a C-shaped, soft-iron yoke 11 and the opposite polar end of which is recessed in a longitudinal recess provided in the soft-iron core 12. The core is a cylinder having an axial hole 13 extending therethrough, such hole communicating with a longitudinal slot 14. The pole piece 15 comprises a unitary block of soft-iron provided with a cylindrical bore of a diameter larger than the outside diameter of the core 12. Such pole piece is dimensioned so that it will slide nicely between the legs of the yoke 11, as shown. The arcuate gap formed between the outer wall of the core and the cylindrical wall of the yoke constitutes the flux gap of the instrument.

A wire wound movable coil 16 is pivoted by a suitably journaled shaft 17 whereby the coil is rotatable coaxially of the core with one side of the coil disposed at all times within the flux gap. Secured to the movable coil is a pointer 18 cooperating with a suitably calibrated scale 19. Although only a small portion of the scale is shown in the drawing those skilled in this art will understand that in an instrument of this class the scale has an arcuate length of approximately 270 angular degrees and is coextensive with the angular range of rotation of the movable coil in the effective portion of the flux gap.

Even though the magnet, yoke, pole piece and core are each machined to very close tolerances and even though these parts are carefully assembled together the magnetic circuit will vary slightly from one assembly to another. Such variations appear as corresponding variations in the position of the pointer upon incremental changes in the magnitude of the current applied through the movable coil. In the case of a preprinted scale it is, therefore, necessary to make certain adjustments in the magnetic circuit so that the deflection characteristics of the assembled mechanism will be uniform and will match the scale graduations to a degree consistent with the basic accuracy of the instrument. Numerous arrangements have heretofore been proposed for this purpose but these are either too critical in application or too expensive.

The magnet, yoke, pole piece and core are secured in fixed position relative to each other by means of a pair of mounting or clamping plates made of a non-magnetic material. Such assembly is shown in the side view of Figure 4. The upper mounting plate 21 has secured thereto three posts 22 (two of which are visible in Figure 4) to which the scale plate 23 is secured as by screws passing into threaded bores provided in the free ends of the posts. The upper mounting plate also has secured thereto a pair of threaded supports 24 which normally carry the upper bridge and jewel bearing, not shown. Similarly, the lower mounting plate 25 carries a pair of supports 26 for the lower bridge and jewel bearing. Those skilled in this art will understand that shaft 17 shown in Figure 1 is mounted for rotation in the aligned jewel bearings carried by the bridges and that the latter also carry abutments to which are secured the conventional spiral springs for conducting current to the movable coil.

The upper mounting plate 21 is shown in detail in the respective plan and side views of Figures 2 and 3. Here are shown clearly the three scale-support posts 22 and the bridge supports 24. The plate is provided with a circular slot 28 which serves to locate the plate precisely with respect to the pole piece, such slot being less than 360° and resulting in an integral tongue portion. Referring back to Figure 1, the pole piece 15 includes an upstanding circular ridge 29 having an outside diameter slightly smaller than the diameter of the circular slot formed in the upper mounting plate. The height of such ridge, axially of the pole piece bore, is approximately equal to the thickness of the mounting plate. Thus, the mounting plate can be positioned on the pole piece with the pole piece ridge extending through the circular plate slot and the back surface of the plate abutting the front end surface of the pole piece. The mounting plate includes three small holes 30 (Figure 2) which correspond, position wise, to the three threaded holes 31 in the front end surface of the pole piece (Figure 1). Hence, the upper mounting plate can be secured rigidly to the upper end of the pole piece by means of three small screws 32, two of which are shown in Figure 5.

It may here be pointed out that the lower mounting plate also includes a circular slot to accommodate a circular ridge formed on the lower end of the pole piece. Such lower mounting plate is also secured to the pole piece by three screws corresponding to the screws 32 shown in Figure 5. Once the two mounting plates are secured in position no relative movement can take place between the plates and the pole piece. However, up to this point in the assembly of the mechanism, the magnet, yoke and pole piece are each free to slide in and out between the two mounting plates 21, 25 (see Figure 4), such sliding movement being restricted, by the pole piece sides, to the plane of the paper and along the magnetic axis of the magnet, as will be clear from a study of Figure 1. It will be noted that the yoke 11 has clearance holes 33 formed through each leg. These holes are alignable with the holes 34 formed in the upper mounting plate, and a similar pair of holes formed in the lower mounting plate but not shown in the drawings. The holes in the mounting plates are of a smaller diameter than the holes in the yoke legs. The amount of sliding movement of the yoke 11 is, therefore, limited to the amount of clearance between the yoke-leg holes 33 and screws 34' that pass through such holes and the aligned holes in the mounting plates, see Figures 4 and 5. Cooperating with each screw 34' is a nut 35 by means of which the yoke can be clamped firmly in fixed position relative to the plates.

As shown in Figure 1, the soft-iron core 12 is provided with two threaded holes 36 formed in the upper end surface. These holes are aligned with holes 37 formed in the tongue portion of the upper mounting plate, which holes 37 are of a larger diameter than the core holes 36 to permit of transverse adjustment of the core within the bore of the pole piece. Attention is directed to the fact that one end of the magnet 10 fits snugly within a longitudinal recess formed in the core whereas the other end of the magnet abuts the central portion of the yoke 11 within a rectangular recess 38 having a width somewhat greater than the width of the magnet. Thus, the core and magnet can be shifted transversely to an extent defined by the size of the holes 37 in the mounting plate. When properly positioned the core is secured in fixed position to the tongue portion of the mounting plate by means of screws 39. Similar screws pass through similar holes provided in the lower mounting plate and into threaded holes provided in the lower end surface of the core.

When assembling the mechanism shown in Figure 5, the two mounting plates are securely fastened to opposite ends of the pole piece 15 as by the screws 32. Since the instrument bridges are secured to the mounting plates the rotation of the movable coil within the pole piece gap remains fixed and the deflection characteristics of the instrument will be effected by the positioning of the core. The core is fastened to the mounting plates by the screws 39 and the yoke is secured in fixed position by the screws 34' and the cooperating nuts 35. A test scale plate is secured in position on the posts 22 such scale plate having scale graduations corresponding precisely to those of the final scale plate but having a fairly large center opening affording access to the fastening screws 34' and 39.

The operator now applies known magnitudes of current to the movable coil and checks the pointer deflections against the scale graduations. If the scale range, that is, the deflection of the pointer between the bottom and top scale marks for a given magnitude of current, is too large correction is made in the conventional manner by either pulling down (demagnetizing) the magnet or by adjustment of the electrical circuit associated with the particular instrument. If the scale range is too short recharging of the magnet may be required. In any event, once having adjusted the deflection relative to top and bottom scale marks, the operator then checks the mid-scale position. Here, if the pointer does not track with the mid-scale mark, the screws 34 and 39 are loosened slightly and yoke 11 moved longitudinally of its arms, one way or the other. Such movement of the yoke results in a corresponding movement of the magnet and core as these parts are held together by magnetic attraction. It will be apparent that this particular adjustment serves to center the core 12 within the pole piece base along the axis of the magnet. When the core, so displaced, results in an alignment of the pointer with the center mark on the scale, the screws 34' (or the cooperating nuts 35) are tightened. The operator now checks intermediate points on the scale such as, for example, the ¼ and ¾ scale marks. Alignment of the pointer with these marks is accomplished by moving the core 12 to one side or the other, that is, transversely of the axis of the magnet, after which the screws 39 are tightened. By performing these two adjustments the operator has, by actual instrument operation, positioned the core so that it is magnetically concentric with respect to the pole piece. Such magnetic concentricity does not necessarily correspond to mechanical concentricity.

As shown in Figures 4 and 5, the adjustment of the position of the yoke 11 with respect to the pole piece 15 is made possible by reason of the clearance holes 33 formed in the yoke. After adjustment, the yoke is secured in fixed position by means of the machine screws 34' and cooperating nuts 35. It will be apparent that the same feature of adjustment can be obtained by having the screws 34' pass through enalrged holes formed in the upper mounting plate 21 and into threaded holes formed in the yoke 11, as in the case of the core-securing screws 39 shown in Figure 5.

Having adjusted the deflection characteristics of a particular mechanism to the scale graduations, the test scale is replaced by a final scale and the mechanism can be secured within an instrument case by suitable means.

As stated hereinabove, the simple adjusting means here described makes it possible to have only one form of preprinted scale while maintaining a constant high accuracy of instrument indication for all instruments of a given design.

Having now described our invention what we desire to protect by Letters Patent is set forth in the following claims.

We claim:
1. In a long scale instrument of the class including a cylindrical core spaced from a bore formed in and extending axially from end to end of a pole piece to form a flux gap, a C-shaped soft-iron yoke with a base section and a pair of legs extending therefrom to embrace said pole piece and a permanent magnet adjustably movable along said base section and generating magnetic lines of flux across the flux gap, an improved arrangement for magnetically positioning the core concentrically of the pole piece bore, said arrangement comprising clamping means, means retaining the pole piece in relatively fixed position with respect to said clamping means, means securing said clamping means to the core while allowing prior to a final tightening for adjustment of the core transversely of the pole piece bore in a first plane passing through the axis of the said bore, and means securing said clamping means to said yoke legs while allowing prior to a final tightening for adjustment of the core transversely of the pole piece bore in a second plane that also passes through the axis of said bore.

2. A magnetic structure for a long scale instrument comprising a permanent magnet of rectangular form, a cylindrical soft-iron core magnetically attached to one polar end of the magnet, a C-shaped soft-iron yoke having a base section magnetically attached to the other end of the magnet and a pair of legs spanning the magnet and the core, a unitary, soft-iron pole piece disposed between the legs of the yoke, said pole piece being provided with a bore extending therethrough from one end to the other and the walls defining the said bore being spaced from the surface of the core, a pair of mounting plates disposed one each on opposite ends of the pole piece, means securing the said plates to the pole piece, means to adjust in one plane the position of the yoke relative to the pole piece comprising connecting means passing through said plates and yoke, with provision for relative lateral movement of the connected parts in one plane before tightening, and means to adjust in directions at an angle to said plane the position of the core and magnet relative to the bore of the pole piece comprising connecting means passing through said plates and into said core, with provision for relative lateral movement of the connected parts in a plane at an angle to said first-mentioned plane before tightening.

3. An assembly for a long scale instrument comprising a C-shaped soft-iron yoke including a base portion provided with a transverse recess and parallel-extending legs, means forming a clearance hole in each yoke leg, a substantially rectangular pole piece made of soft-iron and slidable within the yoke legs, said pole piece being provided with a bore that extends axially from one end to the other, and intersects one side wall of the pole piece; means forming a plurality of threaded holes in the opposite of said ends of the pole piece; an upper mounting plate rigidly secured to the surface at one of said ends of the pole piece by screws passing into the threaded holes formed in the adjacent pole piece end, said mounting plate including a circular slot of less than 360° resulting in an integral tongue portion; a lower mounting plate rigidly secured to the surface at the other of said ends of the pole piece by screws passing into the holes formed in the adjacent pole piece end, said second mounting plate including a circular slot of less than 360° and resulting in an integral tongue portion; means forming aligned holes in the two mounting plates and holes of an enlarged diameter in the tongue portion, locating screws passing through said first-mentioned holes and through the holes in the yoke legs; a cylindrical, soft-iron core disposed within the pole piece bore and spaced therefrom to form a flux gap, said core including an axial bore extending therethrough from end to end, a radial slot communicating with such bore and a longitudinal recess communicating with such slot; a rectangular bar magnet having one polar end fitted within the longitudinal recess of the core and the other polar end abutting the base of the recess formed in the yoke, the width of the magnet being less than the width of the recess in the yoke; a pair of threaded holes formed in each of said ends of the core and aligned with said holes of an enlarged diameter formed in the tongue portions of the mounting plates, and locating screws passing through the holes in such tongue portions and into the cooperating threaded holes in the core ends, the recited arrangement being such that upon loosening of the screws passing through the yoke legs the yoke may be moved in one direction or the other along a plane including the slot in the core and to an extent defined by the size of the clearance holes in the yoke, and upon loosening of the screws threaded in the ends of the core the core and magnet can be moved in one direction or the other in a plane normal to that of the core slot and to an extent defined by the size of the holes formed in the tongue portions of the mounting plates.

4. An assembly for a long scale instrument comprising a C-shaped soft-iron yoke including a base portion provided with a transverse recess and parallel extending legs, a substantially rectangular pole piece made of soft-iron and slidable within the yoke legs, said pole piece being provided with a bore that extends axially from one end to the other end intersects one side wall thereof; threaded holes in each of said ends of the pole piece; an upper mounting plate rigidly secured to the surface at one of said ends of the pole piece by screws passing into threaded holes formed in the adjacent pole piece end, said mounting plate including an annular slot of less than 360° defining an integral tongue portion; a lower mounting plate rigidly secured to the surface at the other of said ends of the pole piece by screws passing into threaded holes formed in the adjacent pole piece end, said second mounting plate also including an annular slot of less than 360° defining an integral tongue portion; means forming aligned holes in the two mounting plates and in the tongue portions, locating screws passing through said first-mentioned holes and loosely through holes in the yoke legs; a cylindrical, soft-iron core disposed within the pole piece bore and spaced therefrom to form a flux gap, said core including an axial bore extending therethrough, a radial slot communicating with such bore and a longitudinal recess communicating with such slot; a rectangular bar magnet having one polar end fitted within the longitudinal recess of the core and the other polar end abutting the base of the recess formed in the yoke, the width of the magnet being less than the width of the recess in the yoke; a pair of holes formed in each of said ends of the core, and locating screws passing loosely through the holes in said tongue portions and into the holes in the core ends; whereby the loose fit of some of said locating screws may be employed to adjust the core transversely of the pole piece bore in a first plane passing through the axis of the said bore, and the loose fit of other of said screws may be employed to adjust the core transversely of the pole piece bore in a second plane that also passes through the axis of said bore.

5. An assembly for a long scale instrument comprising a C-shaped soft-iron yoke including a base portion provided with parallel-extending legs, a substantially rectangular pole piece made of soft-iron and slidable within the yoke legs, said pole piece being provided with a bore that extends axially from one end to the other and intersects one side wall thereof; threaded holes in each of said ends of the pole piece; an upper mounting plate rigidly secured to one end surface at one of said ends of the pole piece by screws passing into threaded holes formed in the adjacent pole piece end, said mounting plate including an annular slot of less than 360° defining an integral tongue portion; a lower mounting plate rigidly secured to the surface at the other of said ends of the pole piece by screws passing into threaded holes formed in the adjacent pole piece end, said second mounting plate also including an annular slot of less than 360° defining an integral tongue portion; means forming aligned holes in the two mounting plates and in the tongue portions locating means passing through said first mentioned holes and loosely through holes in the yoke legs; a cylindrical, soft-iron core disposed within the pole piece bore and spaced therefrom to form a flux gap, said core including an axial bore extending therethrough, a radial slot communicating with such bore and a longitudinal recess communicating with such slot; and a rectangular bar magnet having one polar end fitted within the longitudinal recess of the core and the other polar end abutting the base portion of the yoke; whereby the loose fit of said locating screws may be employed to adjust the core transversely of the pole piece bore in a plane passing through the axis of the said bore.

6. An assembly for a long scale instrument comprising a C-shaped soft-iron yoke including a base portion provided with a transverse recess and parallel-extending legs, a substantially rectangular pole piece made of soft-iron and disposed between the yoke legs, said pole piece being provided with a bore that extends axially from one end to the other and intersects one side wall thereof; threaded holes in each of said ends of the pole piece; an upper mounting plate rigidly secured to one surface at one of said ends of the pole piece by screws passing into threaded holes formed in the adjacent pole piece end, said mounting plate including an annular slot of less than 360° defining an integral tongue portion; a lower mounting plate rigidly secured to the surface at the other of said ends of the pole piece by screws passing into threaded holes formed in the adjacent pole piece end, said second mounting plate also including an annular slot of less than 360° defining an integral tongue portion; means securing said mounting plates to the yoke legs; a cylindrical, soft-iron core disposed within the pole piece bore and spaced therefrom to form a flux gap, said core including an axial bore extending therethrough, a radial slot communicating with such bore and a longitudinal recess communicating with such slot; a rectangular bar magnet having one polar end fitted within the longitudinal recess of the core and the other polar end abutting the base of the recess formed in the yoke, the width of the magnet being less than the width of the recess in the yoke; a pair of holes formed in each of said ends of the core, and locating screws passing loosely through the holes in said tongue portions and into the holes in the core ends; whereby the loose fit of said locating screws may be employed to adjust the core transversely of the pole piece bore in a plane passing through the axis of the said bore.

References Cited in the file of this patent

UNITED STATES PATENTS

| | | |
|---|---|---|
| 627,908 | Davis | June 27, 1899 |
| 2,221,643 | Lederer | Nov. 12, 1940 |
| 2,673,959 | Lovegrove | Mar. 30, 1954 |
| 2,773,240 | Young | Dec. 4, 1956 |